United States Patent [19]

Boone et al.

[11] Patent Number: 4,635,223

[45] Date of Patent: Jan. 6, 1987

[54] FAIL SAFE PROTECTION CIRCUITRY FOR A COMMERICAL MICROPROCESSOR IN ENCRYPTION EQUIPMENT

[75] Inventors: Susan L. Boone, Gilbert; Hugh D. Stuart, Scottsdale, both of Ariz.

[73] Assignee: Motorola, Inc., Schaumberg, Ill.

[21] Appl. No.: 876,290

[22] Filed: Jun. 18, 1986

Related U.S. Application Data

[63] Continuation of Ser. No. 495,234, May 16, 1983.

[51] Int. Cl.$^4$ .................................................. G06F 9/00
[52] U.S. Cl. ..................................................... 364/900
[58] Field of Search ............................... 364/200, 900

[56] References Cited

U.S. PATENT DOCUMENTS

| | | | |
|---|---|---|---|
| 4,256,926 | 3/1981 | Pitroda et al. | 364/200 |
| 4,285,037 | 8/1981 | Von Stetten | 364/200 |
| 4,306,289 | 12/1981 | Lumley | 364/200 |

Primary Examiner—Thomas M. Heckler
Assistant Examiner—John G. Mills
Attorney, Agent, or Firm—Eugene A. Parsons

[57] ABSTRACT

In conjunction with a commercial microprocessor controlled by a program stored in a ROM, a second microprocessor, similar to the first microprocessor, is connected into the system so as to operate similar to the first microprocessor. A four-phase clock steps the first microprocessor, then steps the second microprocessor, then compares the instruction registers of the two microprocessors and causes the instruction to be executed if an exact comparison is detected. If an exact comparison is not detected, the instruction is not executed.

2 Claims, 1 Drawing Figure

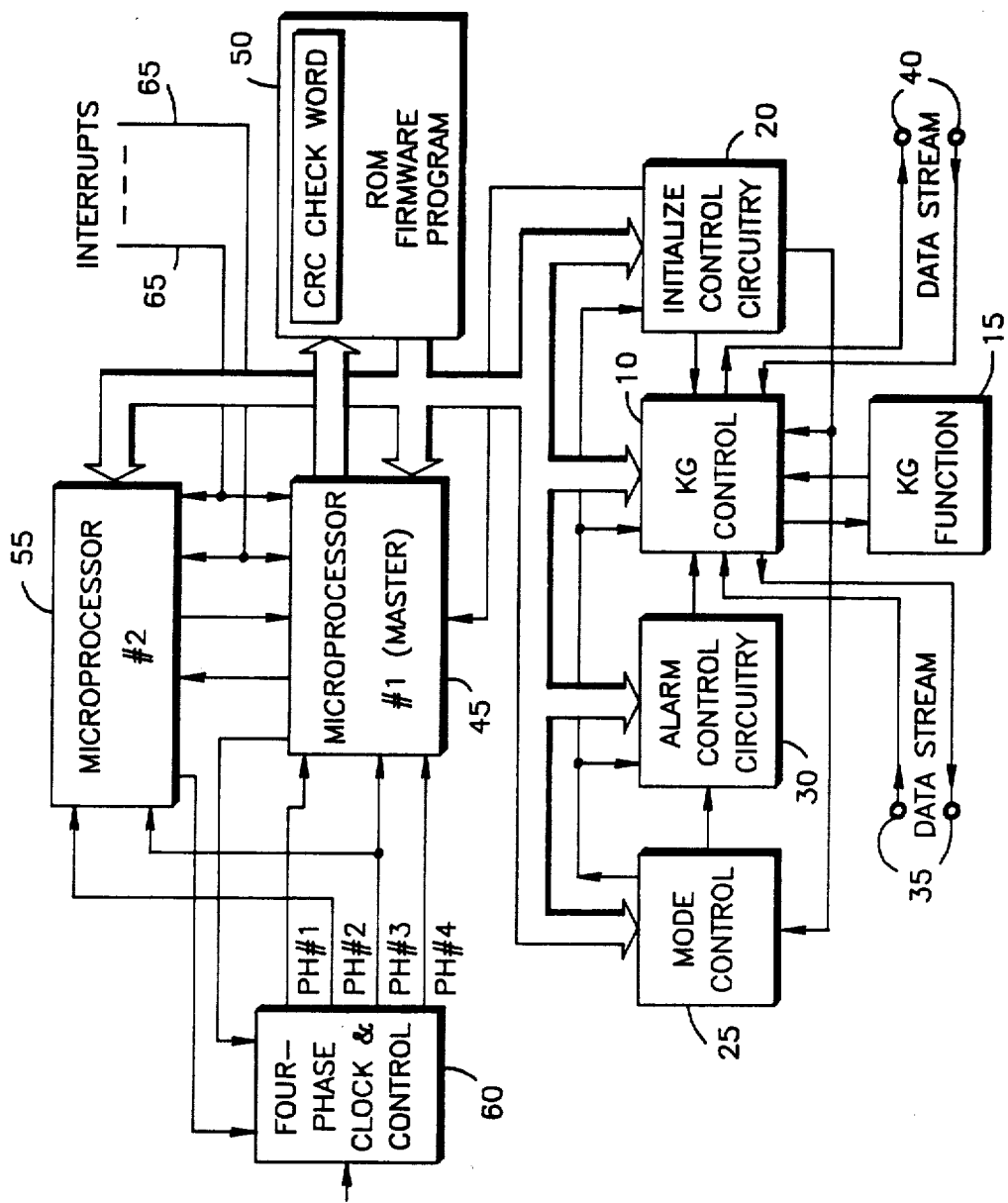

FAIL SAFE PROTECTION CIRCUITRY FOR A COMMERICAL MICROPROCESSOR IN ENCRYPTION EQUIPMENT

This application is a continuation of application Ser. No. 495,234, filed May 16, 1983.

BACKGROUND OF THE INVENTION

The present invention pertains to failure protection circuitry for microprocessor-based equipment, such as encryption equipment and the like. Prior encryption units make extensive use of complex, discrete logic and circuitry to provide essential failure protection against compromising emanations from the unit when one or more device failures occur in the unit while in service. This circuitry consists of numerous checking features on critical operations along with checking logic to check the prime checker.

There is a strong desire to use off-the-shelf (low cost) microprocessors to replace the large amount of discrete logic devices or special, custom LSI devices. However, at the present, a substantial problem exists in that off-the-shelf microprocessor LSI devices, when analyzed using fail safe procedures, cannot be modified by adding circuitry to internal paths in order to prevent security compromises because of a device failure.

SUMMARY OF THE INVENTION

The present invention pertains to the use of dual, similar microprocessors in conjunction with a ROM program and a four-phase clock wherein the first microprocessor is stepped on the first phase of the clock, the second microprocessor is stepped on the second phase of the clock, the instruction registers of the two microprocessors are compared on the third phase of the clock and if an exact comparison is detected the instruction is executed during the fourth phase of the clock. If an exact comparison is not detected the instruction is not executed and another comparison may be started on the first phase of the clock or an alarm may be activated immediately.

This invention permits the safe use of off-the-shelf microprocessors for encryption units and the like by including a unique arrangement of dual microprocessors and a special four-phase clock arrangement to perform the checking for any device failure in either microprocessor, the checking circuitry or the four-phase clock circuitry.

It is an object of the present invention to provide new and improved failure protection circuitry for use with commercial microprocessors.

It is a further object of the present invention to provide failure protection circuitry which allows the use of off-the-shelf microprocessors for encryption units and the like.

It is a further object of the present invention to provide failure protection circuitry which allows the use of low cost, commercially available microprocessors in encryption units and the like.

These and other objects of this invention will become apparent to those skilled in the art upon consideration of the accompanying specification, claims and drawing.

BRIEF DESCRIPTION OF THE DRAWING

The single drawing is a simplified block diagram of an encryption unit embodying the present invention.

DESCRIPTION OF THE PREFERRED EMBODIMENT

Referring to the drawing, a typical encryption unit, embodying the present invention, is illustrated in simplified block form. The blocks include an encryption control block 10 which is controlled by an encryption function stored in a block 15. In conjunction with the encryption control block 10, typical circuits associated therewith include initialized control circuitry 20, mode control circuitry 25 and alarm control circuitry 30. Plain text data is supplied to or received from the encryption control block 10 by way of leads, or data bus (depending upon whether the data is serial or parallel) 35. Cipher text is supplied to or received from the encryption control block 10 by way of leads, or data bus, 40. The encryption unit is controlled by a microprocessor 45, which is in turn controlled by a program stored in a read only memory (ROM) 50. A second microprocessor 55, which is similar to the microprocessor 45, and a four-phase clock and control circuit 60 are incorporated into the encryption unit for failure protection.

The encryption function block 15 contains a typical encryption algorithm, such as the DES algorithm accepted by the National Bureau of Standards. The encryption control block 10, initialize control circuitry 20, mode control circuitry 25 and alarm control circuitry 30 are interconnected in the usual fashion and also have data buses connected to either or both of the microprocessors 45 and 55. The microprocessors 45 and 55 are connected to the ROM 50 by way of data buses so that both microprocessors operate in the same fashion in accordance with the program stored in the ROM 50. In addition, the four-phase clock and control circuit 60 is connected to the two microprocessors 45 and 55 so that pulses in a first phase are supplied to the microprocessor 45, pulses in a second phase are supplied to the microprocessor 55, pulses in a third phase are supplied to both of the microprocessors 45 and 55 and pulses in a fourth phase are supplied to only one of the microprocessors, in this embodiment the microprocessor 45, so that instructions in the microprocessor can be executed. Interconnections between the microprocessors 45 and 55 are supplied to allow comparison of bits in the various instruction registers and a plurality of inputs 65 are connected to the microprocessors 45 and 55 for supplying external commands, interrupts, or the like thereto.

Once the initialized and mode control circuits 20 and 25 are set up and the encryption unit is ready to operate the microprocessor 45, for example, is utilized for the proper storage and control of data, etc. in the encryption control block 10. It will of course be understood that the microprocessor 45 will perform different functions for different encryption systems. In any case the microprocessor 45 is operating much slower than the encryption control block 10, at least a factor of 10 in many instances. Because the microprocessor 45 operates at a relatively slow speed the four-phase clock and control block 60 is relatively easy to implement and may, for example, consist chiefly of four different clocks which operate at four different times so that a pulse first appears on the phase one line, then a pulse appears on the phase two line, then a pulse appears on the phase three line, etc. Thus, a clock pulse can be applied to the microprocessor 45 on the phase number one line and the microprocessor 45 will respond to the clock pulse and step so that the various registers therein are ready with the next instruction. After the microprocessor 45 has responded to the clock pulse and stepped to the next instruction, the four-phase clock and control circuit 60 supplies a clock pulse to the microprocessor 55 and the same response and step occurs. The third clock pulse from the four-phase clock and control circuit 60 is supplied on the third phase line to both of the microprocessors 45 and 55 and the instruction registers are compared, bit-for-bit, within either of the microprocessors 45 and 55 or in a comparison circuit in the four-phase clock and control circuit 60. If an exact comparison is detected a signal is supplied to the four-phase clock and control circuit 60 or within the four-phase clock and control circuit 60 to allow the application of a fourth pulse on the phase four line to the microprocessor 45. The fourth pulse allows the execution of the instruction in the microprocessor 45. It will be apparent to those skilled in the art that the instruction in the microprocessor 50 and the microprocessor 45 is identical and the phase four clock pulse could execute the instruction from the microprocessor 55, rather than the microprocessor 45, if desired. After the instruction is executed a clock pulse appears on the phase one line to start the procedure again. This procedure continues until the entire program is completed or until an exact comparison is not detected. If an exact comparison is not detected, the instruction is not executed, the next phase one and phase two clock pulses are not generated and another comparison try is started with the phase three clock pulse. If a comparison is not detected again the entire encryption unit is halted and an alarm is initiated.

The microprocessors 45 and 55 are commercial, low cost microprocessors which are utilized to check each other and the ROM 50 for possible failures and, therefore, no modifications or added circuitry to internal paths is required. The four-phase clock and control circuitry 60 can include a periodic self check by injecting a wrong bit, or an additional bit, into the comparison of the bits in the registers of microprocessors 45 and 55. It will of course be understood by those skilled in the art that with the continually declining cost of commercial microprocessors, additional microprocessors might be incorporated into the unit for additional failure protection. It should also be understood that while the microprocessor 45 and ROM 50 are illustrated as a portion of an encryption unit, any use of a microprocessor might be protected from otherwise undetectable failures through the use of the present failure protection circuitry. While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. Fail Safe protection circuitry for a commercial microprocessor in encryption equipment comprising:
   a first microprocessor, including instruction registers, connected to perform predetermined functions and control additional external circuitry in accordance with a specific program;
   a second microprocessor similar to said first microprocessor and connected to said first microprocessor for comparing bits stored in the instruction registers;
   a memory having the specific program stored therein and connected to said first and second microprocessors for control thereof in accordance with the stored program; and
   a plural phase clock connected to said first and second microprocessors causing said first microprocessor to step in response to each pulse in a first clock phase with certain instruction bits being stored in the instruction register thereof, said second microprocessor to step in response to each pulse in a second clock phase with certain instruction bits being stored in the instruction register thereof, the bits in the instruction registers of the first microprocessor to be compared to the bits in the instruction registers of the second microprocessor in response to each pulse in a third clock phase, and the instructions from one of said first and second microprocessors to be executed in response to each pulse in a fourth clock phase if a comparison occurs.

2. Fail safe protection circuitry as claimed in claim 1, wherein the memory includes a read-only-memory.

* * * * *